(12) United States Patent
Buhlmann

(10) Patent No.: US 8,641,849 B2
(45) Date of Patent: Feb. 4, 2014

(54) LAMINATED DECORATIVE PLATE AND METHOD FOR THE PRODUCTION THEREOF

(75) Inventor: Carsten Buhlmann, Rangsdorf (DE)

(73) Assignee: Surface Technologies GmbH & Co. KG, Baruth (DE)

( * ) Notice: Subject to any disclaimer, the term of this patent is extended or adjusted under 35 U.S.C. 154(b) by 661 days.

(21) Appl. No.: 12/663,074

(22) PCT Filed: Jun. 4, 2008

(86) PCT No.: PCT/EP2008/056871
§ 371 (c)(1),
(2), (4) Date: Jun. 7, 2010

(87) PCT Pub. No.: WO2008/148771
PCT Pub. Date: Dec. 11, 2008

(65) Prior Publication Data
US 2010/0239820 A1 Sep. 23, 2010

(30) Foreign Application Priority Data
Jun. 4, 2007 (DE) .......................... 10 2007 026 170

(51) Int. Cl.
*B32B 37/00* (2006.01)
(52) U.S. Cl.
USPC ......... 156/228; 156/555; 156/582; 156/583.5
(58) Field of Classification Search
USPC ............ 156/228, 555, 580, 582, 583.1, 583.5
See application file for complete search history.

(56) References Cited

U.S. PATENT DOCUMENTS

| | | | |
|---|---|---|---|
| 3,654,044 A | 4/1972 | Hirota | |
| 6,841,023 B2 * | 1/2005 | Mott | 156/244.16 |
| 2001/0022211 A1 * | 9/2001 | Walsh | 156/226 |
| 2005/0076598 A1 | 4/2005 | Lewark | |
| 2005/0230038 A1 * | 10/2005 | Guckert et al. | 156/264 |
| 2007/0207296 A1 | 9/2007 | Eisermann | |
| 2009/0075039 A1 | 3/2009 | Ould Bougrissa | |
| 2010/0068448 A1 | 3/2010 | Martinez Segura | |

FOREIGN PATENT DOCUMENTS

| | | |
|---|---|---|
| CN | 2741073 Y | 11/2005 |
| CN | 2825245 Y | 10/2006 |
| DE | 2501625 A1 | 7/1976 |
| DE | 2719769 | 11/1978 |
| DE | 20315676 | 12/2003 |
| WO | 03095202 | 11/2003 |
| WO | 2007048977 A1 | 5/2007 |

OTHER PUBLICATIONS

International Search Report dated Sep. 15, 2008 received in corresponding international application No. PCT/EP08/56871, 3 pgs.
Translation of the International Preliminary Report on Patentability received in corresponding international application No. PCT/EP08/56871, 11 pgs.
Abstract of CN2741073; Nov. 16, 2005.
Abstract of CN2825245; Oct. 11, 2006.

* cited by examiner

*Primary Examiner* — James Sells
(74) *Attorney, Agent, or Firm* — Senniger Powers LLP

(57) ABSTRACT

The invention relates to a laminated decorative plate comprising a core made of a fiber or particle material, a resinous intermediate layer on at least one side of the core, a decorative layer not impregnated with resin and having a graphic image of the surface of the imitated material, and a transparent core layer, into which the relief-like reproduction of the surface structure of the imitated material is stamped. The intermediate layer is made of liquid glue, curable by pressure and/or heat, that is applied to the core.

10 Claims, No Drawings

LAMINATED DECORATIVE PLATE AND METHOD FOR THE PRODUCTION THEREOF

The invention relates to a laminated decorative plate according to the generic part of claim 1 and to a method for its production.

Decorative plates of this kind are known for example from WO 03/095202 A1. They are comprised of a plate-like core made from fiber material and having a resin-containing intermediate layer, a decorative layer and a cover layer provided with a relief on its one side and a counteracting layer on its other side. The decorative layer reproduces a graphic image of the surface of an imitated material. The relief of the cover layer must be arranged perfectly fitting over the pattern of the decorative layer. This is achieved by the decorative layer which usually consists of paper being placed onto the intermediate layer preferably in a condition not impregnated with glue, thus avoiding a change of the dimensions with regard to the relief stamp for the cover layer.

Prior to hot pressing, the resin-containing intermediate layer is formed as a fixed coating on the core or as a separate prefabricated adhesive layer. The glue content of this layer must be determined during hot pressing depending on the absorbency of the adjacent layers. It is also required for the decorative paper to be cut to size and placed perfectly fitting onto the prepared core plate prior to the hot pressing operation.

The invention is based on the object of providing a laminated decorative plate that can be produced more easily and inexpensively and a method for the production thereof.

This object is achieved by a decorative plate as defined in claim 1 and by a method as defined in the further independent claim 8.

Namely, it was found out that a separate production of the resin-containing intermediate layer is no longer required if a liquid glue is used which is curable by pressure and/or heat. This liquid glue can be applied in one step with the decorative layer and where necessary with the cover layer. It is not necessary to cut the decorative layer to size, because the fitting accuracy can be achieved by the usual typographical measures. This results in a considerable simplification and cost reduction of the production process.

It is now possible to account for the absorbency of the core and the decorative layer directly during the production process, through the application of the liquid glue. Stockpiling of specially coated core and intermediate layer materials is not necessary.

Preferably, the liquid glue which is curable by pressure and/or heat is urea formaldehyde glue. Such glues are normally delivered as a two-component system and are mixed immediately before they are applied. They can be cured by heating. But certain products will become cured to an extent sufficient for fixing the decorative layer already at ambient temperatures and under pressure. A suitable product is for example Adhesive 1206 with Hardener 2547 of Casco Adhesives, Stockholm, Sweden.

Glue which is also preferred is melamine formaldehyde glue. It is beneficial and simplifies the production process if a product is used which is the same as that for the production of the cover layer. Melamine urea formaldehyde glues are suitable glues, too.

In a preferred embodiment, the cover layer is formed free from cellulose. Particularly, it includes no cellulose fiber-containing supporting layers such as paper or the like. Preferred materials for the cover layer are melamine resins or acrylic lacquer. PVC is also suited. These materials of the cover layer may have incorporated fine powders of hard solids thus increasing the abrasion resistance. Corundum for example is suitable for this purpose.

Cover layers free from cellulose have the advantage of high transparency. Moreover, they can be produced more easily and inexpensively, because no fiber-containing supporting material and its separate impregnation are required.

The cover layer can be applied to the decorative layer in the form of a film made from thermoplastic material or also as a liquid.

Printed paper is particularly preferred for the cover layer. The printed side can be provided with a thin lacquer film which however does not impregnate the paper layer and does not change its dimensions.

Fiber materials like high (HDF) or medium (MDF) density fiber board or also particle board are suitable as a core material. HDF is particularly preferred.

If the decorative layer and the cover layer are present only on one side of the core, it is advantageous to provide a so-called counteracting layer on its other side to prevent the finished plate from warping or bending as a result of influences of temperature or humidity. The thickness of this layer must be matched with the coating of the other side. Neutral paper with a solid or liquid resin as a glue is suitable for this layer.

The invention also relates to a method as defined in the further independent claim 8, for the production of the above-described laminated decorative plate according to the present invention. Compared to prior art, this method is simpler, because it can be carried out in one or two working steps. Namely, applying the liquid glue which is curable under pressure and/or heat, placing and pressing-on the decorative layer and where necessary providing the counteracting layer can be performed as a lamination process in one working step and thereafter the cover layer can be applied as a liquid layer or film and the entire laminated structure cured under pressure and/or heat in a second working step while simultaneously forming a relief structure in the surface of the cover layer using a suitable pressing tool. The work in the first step can be performed without the application of heat. The second working step can immediately follow the first working step thus allowing continuous working. In the first working step, a calendering press can be used for example which is provided with suitable feeding devices for the core material and the decorative layer and where necessary for the counteracting material and with means for applying the liquid glue. After the calendering operation, the plate can be divided if necessary and provided with the cover layer in a short-cycle press under application of pressure and heat. This second working step can also be performed continuously in a heated double belt press, whereupon the plate can be divided according to needs.

The pressing tool (e.g. plate or roller) for forming the surface relief can be adjusted for the pattern of the decorative layer, for example by means of photoelectrically read register marks on the decorative layer. In this way, the imitation of a material in which the surfaces pores and the visible pattern are correlated, e.g. wood, is improved. It is also possible to work in a continuous fashion, because it is no longer necessary to cut the decorative layer to size and to place it manually onto the core if necessary.

Of course, intermediate storage of the product after the first working step is also possible where necessary.

Also, the decorative plate according to the invention can be formed with particularly deep surface structures if the intermediate layer is still yielding during embossing and/or if the thickness of the cover layer is suitably selected.

Also, the product and method according to the invention do not require a printing base paper of a particularly high quality for the decorative layer in order to achieve a good alignment of the graphic pattern and the surface relief.

In the following, two examples of the laminated decorative plate and its production method according to the invention will be described.

A) Buildup of the layers of the decorative plate with urea formaldehyde glue (from top to bottom):
1) Cover layer from melamine resin applied in the liquid form or previously impregnated overlay film. In both cases the cover layers have embedded therein corundum which has an anti-abrasion effect.
2) Printed decorative paper either in the dry state (i.e. not impregnated) or as film finish coated with a thin lacquer film.
3) Layer with urea formaldehyde glue.
4) HDF board.
5) Layer with urea formaldehyde glue.
6) Counteracting paper for covering the lower glue layer (optionally required).

In the method for producing this plate the layers from 2) to 6) are firmly glued together. Thereafter, layer 1 is pressed into the decorative paper in a short-cycle press or in a continuous double belt press, wherein a part of the abrasion-resistant melamine layer closes the surface. During this operation, also a relief structure is pressed in.

B) Buildup of the layers of a decorative plate with liquid melamine as a connecting resin size layer (from top to bottom):
1) Cover layer from melamine resin applied in the liquid form. This has embedded therein corundum which has an anti-abrasion effect.
2) Printed decorative paper: This decorative paper is dry, but during the pressing operation melamine resin can penetrate into the paper from the bottom and from the top.
3) Melamine layer applied in a liquid state.
4) HDF board.
5) A counteracting layer as described under a) item 5 and 6.

In the method for producing this plate it is possible to press dry decorative paper onto a supporting plate (e.g. HDF board) in only one working step by the above-described layers 2) to 5) being pressed or placed in a cold state between two calender rolls in a first partial step and thereafter pressed together in a short-cycle press or in a continuously operating double belt press under the influence of heat and pressure. The working step "impregnation" is no longer required in this procedure.

The invention claimed is:

1. A method for producing a laminated decorative plate, said method comprising a first production step of producing a semifinished product comprising the substeps of:
 a) providing a plate made of a fiber or particle material;
 b) coating the plate on at least one side with a layer of glue comprising a liquid glue curable by pressure and/or heat;
 c) pressing a decorative layer not impregnated with resin onto the layer of glue simultaneously with said coating the plate with the layer of glue in a single working step;
 wherein the steps a) to c) are performed as a lamination process to produce the semifinished product;
 d) applying a cover layer comprising a melamine resin to the semifinished product to form a laminated product; and
 e) pressing and heating the laminated product while forming a surface structure of the cover layer;
 wherein substeps d) and e) are performed in a short-cycle press or in a continuous double belt press.

2. The method of claim 1, wherein substeps d) and e) are performed in a short-cycle press or in a continuous double belt press using liquid melamine formaldehyde as a material for the cover layer.

3. The method of claim 1, further comprising substep f) applying a counteracting layer to the plate made of a fiber or particle material if the decorative layer and the cover layer are present on only one side of the plate.

4. The method of claim 1, further comprising substep f) applying a counteracting layer to the plate made of a fiber or particle material if the decorative layer is present on only one side of the plate.

5. The method of claim 3, wherein the substeps a), b), c), and f) are performed as part of the first production step to produce the semifished product.

6. The method of claim 4, wherein the substeps a), b), c), and f) are performed as part of the first production step to produce the semifinished product.

7. The method of claim 6, wherein substeps d) and e) are performed in a short-cycle press or in a continuous double belt press using liquid melamine formaldehyde as a material for the cover layer.

8. The method of claim 2, wherein the second production step including substeps d) and e) is performed as a separate step after the first production step including substeps a) to c) is complete.

9. The method of claim 1, wherein the semifinished product is a storable semifinished product.

10. The method of claim 1, wherein the semifinished product is stored before performing substeps d) and e).

\* \* \* \* \*